US007158931B2

(12) United States Patent
Allegro

(10) Patent No.: US 7,158,931 B2
(45) Date of Patent: Jan. 2, 2007

(54) METHOD FOR IDENTIFYING A MOMENTARY ACOUSTIC SCENE, USE OF THE METHOD AND HEARING DEVICE

(75) Inventor: Silvia Allegro, Oetwil am See (CH)

(73) Assignee: Phonak AG, Stafa (CH)

( * ) Notice: Subject to any disclaimer, the term of this patent is extended or adjusted under 35 U.S.C. 154(b) by 781 days.

(21) Appl. No.: 10/059,059

(22) Filed: Jan. 28, 2002

(65) Prior Publication Data

US 2003/0144838 A1 Jul. 31, 2003

(51) Int. Cl.
*G10L 15/00* (2006.01)

(52) U.S. Cl. ...................................... 704/225; 704/200

(58) Field of Classification Search ................ 704/200, 704/225

See application file for complete search history.

(56) References Cited

U.S. PATENT DOCUMENTS

| | | | | |
|---|---|---|---|---|
| 5,596,679 A * | 1/1997 | Wang | | 704/236 |
| 5,604,812 A | 2/1997 | Meyer | | |
| 5,819,217 A * | 10/1998 | Raman | | 704/233 |
| 6,721,701 B1 * | 4/2004 | Goss et al. | | 704/231 |

FOREIGN PATENT DOCUMENTS

| | | |
|---|---|---|
| EP | 0 732 036 B1 | 8/1994 |
| EP | 0 814 636 A | 6/1996 |
| WO | 0 1 76321 A | 10/2001 |
| WO | 01 20965 A2 | 11/2001 |

OTHER PUBLICATIONS

Feldbusch, Friditjof. "Geräuscherkennung mittels Neuronaler Netze," Zeitschrift Für Audiologie Jan. 1998.

Ostendorf, M. et al. "Klassifikation von akustischen Signalen basierend auf der Analyse von Modulationsspektren zur Anwendung in digitalen Hörgeräten." AG Medizinische Physik, Fachbereich Physik, Carl von Ossietzky Universität Oldenburg. Zeitschrift Für Audiologie-Supplementum Jan. 1998.

Kates, James M. "Classification of background noises for hearing-aid applications" Journal Acoustical Society of America, 97 (1), Jan. 1995.

Ostenforf, M. et al Empirische Klassifizierung verschiedener akustischer Signale und Sprache mittels einer Modulationsfrequenzanalyse. AG Medizinische Physik, Fachbereich Physik, Carl von Ossietzky Universität Oldenburg.

Hirsch, Herbert L. Statistical Signal Characterization, Published by Artech House, Inc., Norwood, MA., 1992.

Hirsch, Herbert L. Statistical Signal Characterization, Published by Artech House, Inc., Norwood, MA., 1992. not complete date found.

* cited by examiner

*Primary Examiner*—Daniel Abebe
(74) *Attorney, Agent, or Firm*—Pearne & Gordon LLP

(57) ABSTRACT

A method and a device for identifying an acoustic scene are provided, whereas the method comprises the steps that an acoustic input signal, preferably recorded by at least one microphone, is processed in at least two processing stages in such a manner that an extraction phase is provided in at least one of the at least two processing stages, in which extraction phase characteristic features are extracted from the input signal, and that an identification phase is provided in each processing stage, in which identification phase the extracted characteristic features are classified. According to the classification of the features, class information is generated in at least one of the processing stages, which class information characterizes or identifies the acoustic scene. Furthermore, a hearing device is described having incorporated the method and the device according to the invention.

37 Claims, 5 Drawing Sheets

METHOD FOR IDENTIFYING A MOMENTARY ACOUSTIC SCENE, USE OF THE METHOD AND HEARING DEVICE

TECHNICAL FIELD

The invention is generally related to a method for identifying an acoustic scene, and more particularly to optimize the effectiveness of a hearing device for its user in all situations including the adaptation to varying acoustic environments or scenes.

BACKGROUND OF THE INVENTION

Modern day hearing aids, when employing different hearing programs, permit their adaptation to varying acoustic environments or scenes. The hearing program can be selected either via a remote control a by means of a selector switch on the hearing device itself. For many users, however, having to switch program settings is a nuisance, or difficult, or even impossible. Nor it is always easy even for experienced wearers of hearing devices to determine at what point in time which program is most comfortable and offers optimal speech discrimination. An automatic recognition of the acoustic scene and corresponding automatic switching of the hearing program settings in the hearing device is therefore desirable.

There exist several different approaches to the automatic classification of acoustic scenes or of an acoustic input signal, respectively. All of the methods concerned involve the extraction of different features from the input signal, which may be derived from one or several microphones in the hearing device. Based on these features, a pattern recognition device employing a particular algorithm makes the determination as to the attribution of the analyzed signal to a specific acoustic scene. These various existing methods differ from one another both in terms of the features on the basis of which they define the acoustic scene (signal analysis) and with regard to the pattern recognition device, which serves to classify these features (signal identification).

From the publication of the international patent application having the publication file No. WO 01/20965 a method and a device for identifying an acoustic scene are known. Described is a single-stage process in which an acoustic input signal is processed in a feature extraction unit and, afterwards, in a classification unit, in which the extracted features are classified to generate class information. Good results are obtained by this known teaching in particular if audio-based features are also extracted. An improvement is desirable particularly in the field of hearing devices, since in this application field the classification of acoustic scenes must be very accurate. At the same time, the occurrence of several very broad sound classes, as e.g. music or noise, cause greater difficulties. It corresponds to the nature of these sound classes that they are very general and broad, i.e. their occurrence may be in manifold manner. The sound class "noised", for examples comprises very different sounds as e.g. background noise resulting from discussions, train station noise, hair dryer noise, and the sound class "music" comprises for example pop music, classic music, single instruments, singing, etc.

Especially because of the very general nature of these sound classes, it is very difficult to obtain a good recognition rate with the aid of the known processing methods in a feature extraction unit and a following classification unit. In fact, the robustness of the recognition system can be improved by the selection of features as has been described in WO 01/20965 for the first time, namely by using auditory-based features. Nevertheless, it is very difficult to separate between different general sound classes in a clear and doubtless manner, because of the high variance of these general sound classes.

It is therefore an object of this invention to introduce a method for identifying an acoustic scene, which is more reliable and more precise compared to prior art methods.

BRIEF SUMMARY OF THE INVENTION

The foregoing and other objects of the invention are achieved by processing an acoustic input signal in a multi-stage process in which at least two classification stages are implemented, whereas each stage preferably comprises an extraction phase and an identification phase. The present invention has the advantage to obtain a very robust and precise classification of the momentary acoustic scene. The present invention allows preventing successfully a wrong classification of, for example, pop music in the sound class of "speech in noise". In addition, the present method allows a breakdown of a general sound class, as for example noise, in subclasses, as for example traffic noise or background noise resulting from discussions. Special situations, as for example in-the-car noise, can also be recognized. In general, room characteristics can be identified and taken into consideration correspondingly in further processing of important signal parts. Furthermore, the present invention can be used to localize sound sources, whereby the possibility is obtained to detect the occurrence of a specific sound source in a mixture of several other sound sources.

The present invention is not only directed to a method for identifying an acoustic scene, but also to a corresponding device and, in particular, to a hearing device, whereas under the term hearing device it is intended to include hearing aids as used to compensate for a hearing impairment of a person, but also all other acoustic communication systems, such as radio transceivers and the like. Furthermore, the present invention is also suitable to incorporate into implantable devices.

BRIEF DESCRIPTION OF THE DRAWINGS

In the following, the invention is explained in more detail by way of an example with reference to drawings. Thereby, it is shown in.

DETAILED DESCRIPTION OF TEE INVENTION

Figure 1:
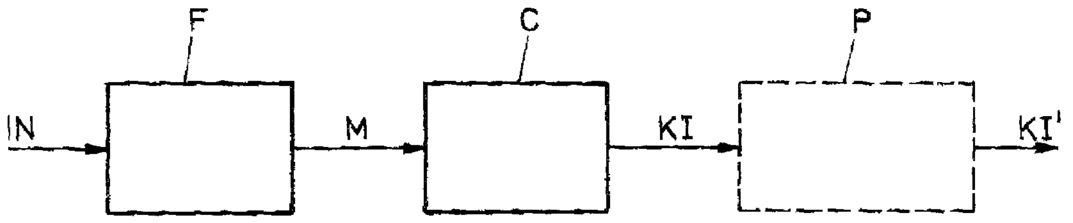
FIG. 1 a known single-stage device for identifying an acoustic scene.

FIG. 1 shows a known single-stage device for identifying an acoustic scene, whereby the device comprises a feature extraction unit F, a classification unit C and a post-processing unit P connected together in sequence.

An acoustic input signal IN, which has been recorded by a microphone, for example, is fed to the feature extraction unit F in which characteristic features are extracted.

For the extraction of features in audio signals, J. M. Kates in his article titled "Classification of Background Noises for Hearing-Aid Applications" (1995, Journal of the Acoustical Society of America 97(1), pp. 461–469) suggested an analysis of time-related sound level fluctuations and of the sound spectrum. On its part, the European Patent EP-B1-0 732 036 proposed an analysis of the amplitude histogram for obtaining the same result. Finally, the extraction of features has been investigated and implemented based on an analysis of different modulation frequencies. In this connection, reference is made to the two papers by Ostendorf et al, titled "Empirical classification of different acoustic signals and of speech by means of a modulation frequency analysis" (1997, DAGA 97, pp. 608–609), and "Classification of acoustic signals based on the analysis of modulation spectra for application in digital hearing aids" (1998, DAGA 98, pp. 402–403). A similar approach is described in an article by Edwards et al. titled (Signal-processing algorithms for a new software-based, digital hearing device" (1998, The Hearing Journal 51, pp. 44–52). Other possible features include the sound level transmission itself or the zero-crossing rate as described e.g. in the article by H. L. Hirsch, titled "Statistical Signal Characterization" (Artech House 1992). So far, the features being used for the analysis of audio signals are strictly technically-based.

Furthermore, it has been pointed out in the already mentioned publication of the International Patent Application WO 01/20965 that besides the mentioned technical features the use of auditory-based features is very advantageous.

According to FIG. 1 the features M extracted in the feature extraction unit F will be fed to the classification unit C in which one of the known pattern identification methods is being basically applied for the sound classification. Particularly suitable pattern recognition systems are the so-called distance estimators, Bayes' classifiers, fuzzy logic systems and neuronal networks. Details of the first two methods mentioned above are contained in the publication titled "Pattern Classification and Scene Analysis" by Richard O. Duda and Peter E. Hart (John Wiley & Sons, 1973). For information on Neuronal Networks, reference is made to the standard work by Christopher M. Bishop, titled "Neural Networks for Pattern Recognition" (1995, Oxford University Press). Reference is also made to the following publications: Ostendorf et al., "Classification of acoustic signals based on the analysis of modulation spectra for application in digital hearing aids" (Zeitschrift für Audiologie (Journal of Audiology), pp. 148–150); F. Feldbusch, "Sound recognition using neuronal networks" (1998, Journal of Audiology, pp. 30–36); European Patent Application with publication No. EP-A1-0 814 636; and U.S. patent having publication No. U.S. Pat. No. 5,604,812. Besides the mentioned pattern recognition methods, by which only the static properties of the interesting sound classes are being modeled, there are also mentioned other methods in the already mentioned publication of the International Patent Application WO 01/20965 by which dynamic properties are being considered (time invariant systems).

According to FIG. 1, class information KI are being obtained by processing steps implemented in the classification unit C. The class information KI may be fed, as the case may be, to a post-processing unit P for the possible revision of the class affiliation. As a result, revised class information KI' are obtained in the following.

Figure 2:
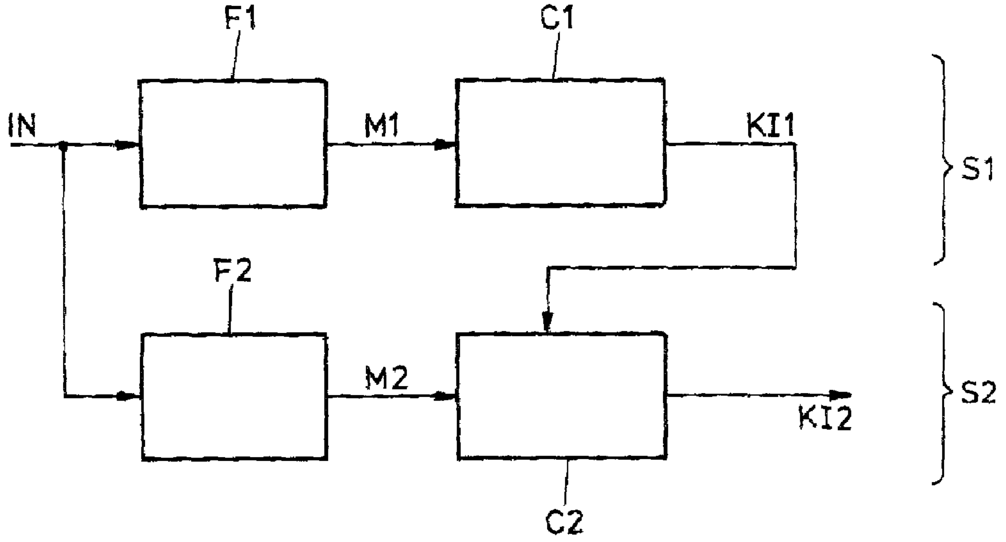
FIG. 2 a first embodiment of a device according to the invention with two processing stages.

In FIG. 2, a first embodiment of a device according to the present invention is shown. The device has two processing stages S1 and S2, whereby a feature extraction unit F1 or F2, respectively, and a classification unit C1 or C2, respectively, are provided in each stage S1 and S2, respectively. The original input signal IN is fed to both processing stages S1 and S2, respectively, namely to the feature extraction unit F1 as well as to the feature extraction unit F2, which are each operatively connected to the corresponding classification unit C1 and C2, respectively. It is important to note that the class information KI1, which are obtained in the first processing stage S1 on the basis of calculations in the classification unit C1, has effect on the classification unit C2 of the second processing stage S2, in fact one of several possible pattern identification methods is selected, for example, and applied to the sound classification in the classification unit C2 of the second processing stage S2.

The embodiment generally represented in FIG. 2 of the present invention will be further described now by way of a concrete example:

By the feature extraction unit F1, the features tonality, spectral center of gravity (CGAV), fluctuation of the spectral center of gravity (CUSS) and spectral width and settling time are being extracted and classified in the classification unit C1, in which a HMM—(Hidden Markov Model) classifier is being used, whereby the input signal IN is classified in one of the following classes by the HMM classifier: "speech", "speech in noise", "noise" or "music". This result is referred to as class information KI. The result of the first processing stage S1 is fed to the classification unit C2 of the processing S2 in which a second set of features is being extracted using the feature extracting unit F2. Thereby, the additional feature variance of the harmonic structure (pitch)—also referred to a Pitchvar in the following—is being extracted besides the features tonality, spectral center of gravity and fluctuation of the spectral gravity. On the basis of these features the result of the first processing stage S1 will be verified and, if need be, corrected. The verification is being done with the aid of a rule-based classifier in the classification unit C2. The rule-based classifier contains a few simple heuristic decisions only, which are based on the four features and which are orientated at the following reflections:

The feature tonality will be used in each class for the correction if the value of the feature completely lies outside of a valid value range of the class information KI1, which has been determined in the first classification unit C1—i.e. by the HMM classifier. It is expected that the tonality for "music" is high, for "speech" it is in the middle range, for "speech in noise" it is a little bit lower and for "noise" it is low. If, for example, an input signal IN falls into the class "speech" by the classification unit C1 then it is expected that corresponding features which have been determined in the feature extraction unit F1 have indicated to the classification unit C1 that the relevant signal part in the input signal IN is strongly fluctuating. If, on the other side, the tonality for this input signal IN is very low, the correct class information will not be "speech" with high probability but "speech in noise". Similar considerations can be carried out for the other three features, namely for the variance of the harmonic structure (Pitchvar), the spectral center of gravity ((CGAV) and for the fluctuation of the spectral gravity (CGFS). Accordingly, the rules for the rule-based classifier which is implemented in the classification unit C2 can be formulated as follows:

| Class information: KI1: | Condition: | Class information KI2: |
|---|---|---|
| "speech" | If tonality low | "speech in noise" |
| | If CGFS high and CGAV high | "music" |
| | otherwise | "noise" |
| "speech in noise" | If tonality high | "speech" |
| | If tonality low or CGAV high | "noise" |
| "noise" | If tonality high | "music" |
| "music" | If tonality low or Pitchvar low or CGAV high | "noise" |

For this embodiment of the present invention the recognition has even emerged as a surprise, namely that almost the same features are used in the second processing stage S2 as have been used in the first processing stage S1. Furthermore, it can be noted that the feature tonality is best suitable in order to correct an error which has been generated by the classification unit C1. After all, it can be noted that the tonality is most important for the use of the rule-based classifier.

A test of the afore described embodiment has revealed that for the simple process having two stages the hit rate improved by at least 3% compared to the single-stage process. In several cases it has been possible to improve the hit rate by 91%.

Figure 3:
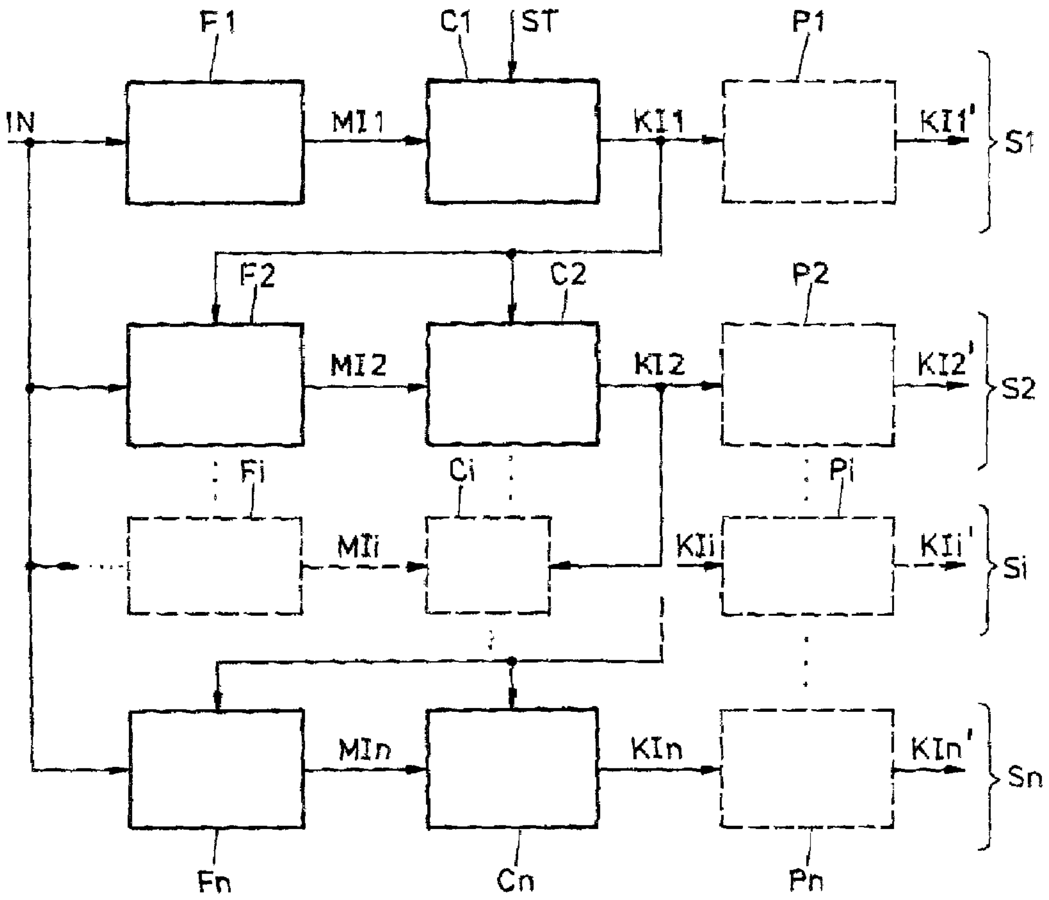
FIG. 3 a second, general embodiment of a multistage device according to the present invention.

In FIG. 3 a further embodiment of the present invention is shown in a general representation in which a process is shown with n stages. Each of the processing stages S1 to Sn comprises, as a consequence of the aforementioned considerations, a feature extraction unit F1, . . . , Fn followed by a classification unit C1, . . . , Cn for the generation of the corresponding class information KI1, . . . , KIn. As the case may be, a post-processing unit P1, . . . , Pn for the generation of revised class information KI1', . . . , KIn' is provided in each or in a single or in several processing stages S1, . . . , Sn.

In continuation of the embodiment according to FIG. 2, the embodiment according to FIG. 3 is particularly suited to a so-called coarse-fine classification. In a coarse-fine classification a result obtained in the processing stage i will be refined in a following processing stage i+1. In other words a coarse classification is provided in a superior processing stage, whereby, on the basis of the coarse classification, a fine classification based on more specific feature extractions and/or classification methods is implemented in an inferior processing stage. This process can also be seen as a generation of hypothesis in a superior processing stage which hypothesis is reviewed in a following, i.e. inferior processing stage, in other words, the hypothesis is confirmed or rejected in this inferior processing stage. At this point it is emphasized that the hypothesis which is generated in a superior processing stage (coarse classification) can be provided by other sources, particularly by manual means, as e.g. by a remote control or by a switch. In FIG. 3, this is indicated, representatively in the first processing stage S1, by a controlled variable ST by which for example the calculation in the classification unit C1 can be overruled. As a matter of course, the control variable ST can also be fed to a classification unit C2 to Cn or to a post-processing unit P1 to Pn of another processing stage S1 to Sn.

In a classification system according to the present invention having several processing stages S1 to Sn a task can be assigned to each of the processing stages S1 to Sn, although it is not mandatory, as for example: a coarse classification, a fine classification, a localization of a sound source, a verification whether a certain sound source, e.g. in-the-car noise, exists, or an extraction of certain signal parts of an input signal, e.g. the elimination of echo as a result of certain room characteristics. Each of the processing stages S1 to Sn are therefore individual in the sense that, for each stage, different features are extracted and different classification methods are being used, In a further embodiment of the present invention, it is provided to locate an individual signal in a mixture of different signal parts in a first processing stage S1, to implement a coarse classification of the located signal source in a second processing stage S2, and to implement a fine classification of the coarse classification obtained in the second processing stage S2.

Furthermore, a direction filtering can follow the localization of a sound source performed in the first processing stage, e.g. by using the Multi-Microphone Technology.

Naturally, a feature extraction unit F1, . . . , Fn can be subdivided into several classification units C1, . . . , Cn, i.e. the results of a feature extraction unit F1, . . . , Fn can be used by several classification units C1, . . . , Cn. Furthermore, it is feasible that a classification unit C1, . . . , Cn can be used in several processing stages S1 to Sn. Finally, it is possible that the class information KI1 to KIn or the revised class information KI1' to KIn' obtained in the different processing stages S1 to Sn are weighted differently in order to obtain a final classification.

Figure 4:
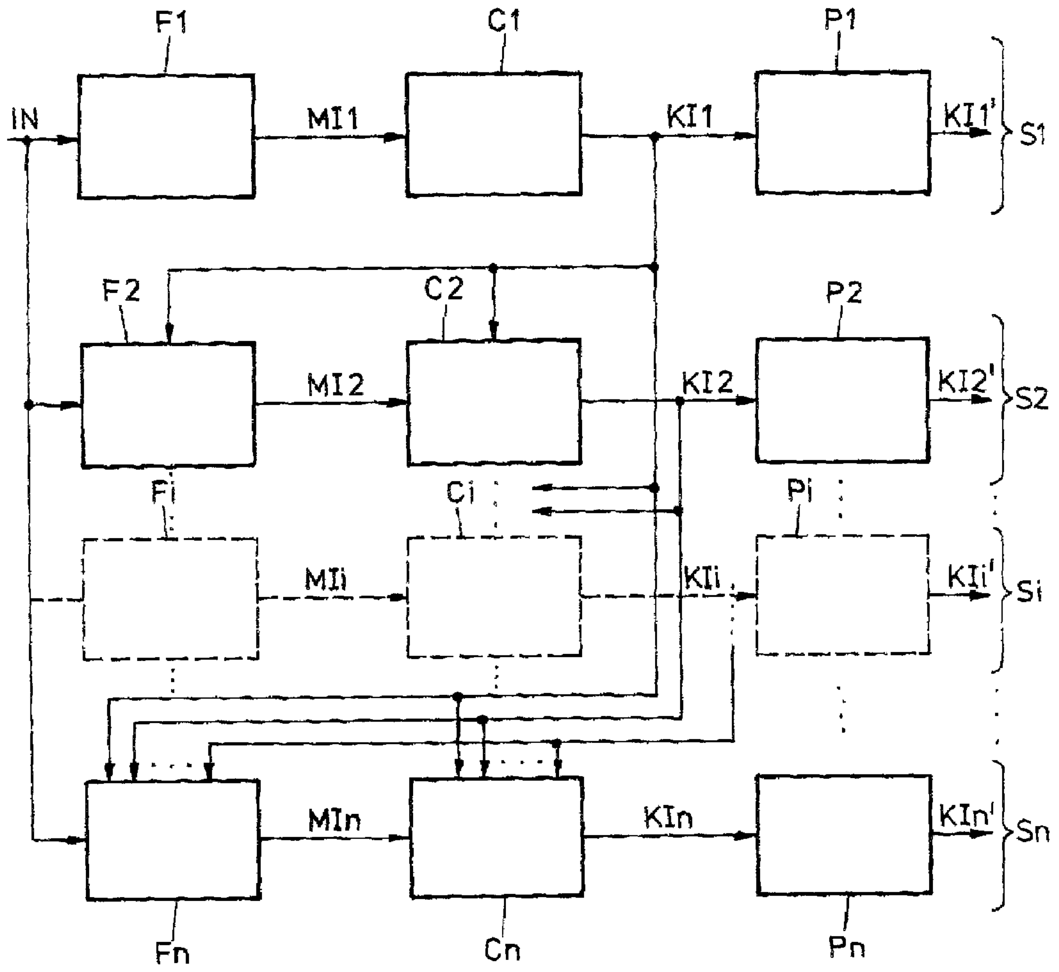
FIG. 4 a third, general embodiment of a multistage device according to the present invention.

In FIG. 4, a further embodiment according to the invention is represented for which several processing stages S1 to Sn are again being used. Apart from the embodiment according to FIG. 3, the class information KI1 to KIn will not only be used in the immediately following processing stage but, as the case may be, in all inferior processing stages. In analog manner, the results of the superior processing stage S1 to Sn may also have their impact on the inferior feature extraction units F1 to En or on the features to be extracted, respectively.

The processing units P1 to Pn may also be implemented in the embodiment according to FIG. 4, in which post-processing units P1 to Pn intermediate results of the classification are obtained, and in which post-processing units P1 to Pn revised class information KI1' to KIn' are generated.

Figure 5:
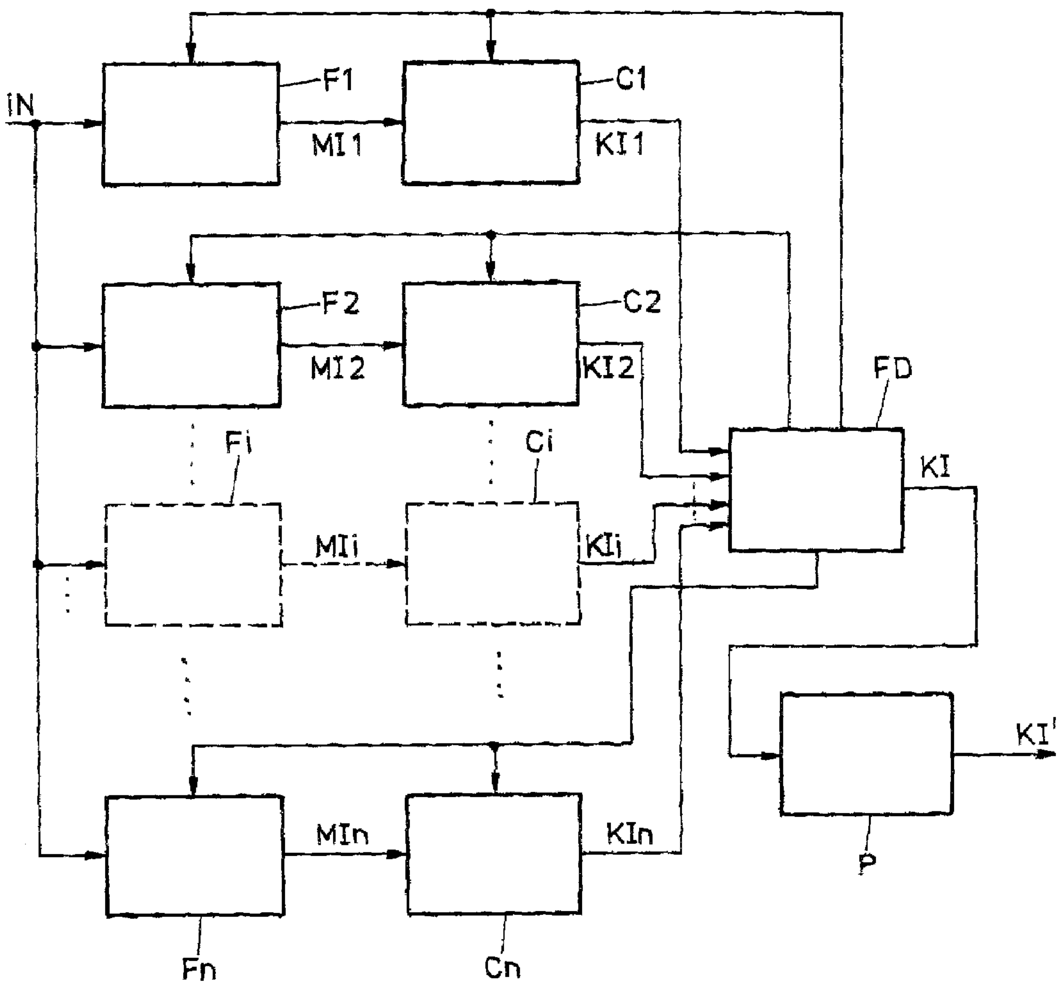
FIG. 5 a fourth, general embodiment of a multistage device according to the present invention.

In FIG. 5, a further embodiment of the present invention is shown having a multistage device for identifying the acoustic scene, again in general form. As for the embodiments according to FIGS. 3 and 4 several processing stages S1 to Sn are shown with feature extraction units F1 to Fn and classification units C1 to Cn. The class information KI1 to KIn obtained in each processing stage S1 to Sn are fed to a decision unit FD in which the final classification is obtained by generating the class information KI. In the decision unit FD it is provided, if need be, to generate feedback signals which are fed to the feature extraction units F1 to F1 and/or to the classification units C1 to Cn in order to adjust, for example, one or several parameters in the processing units, or in order to exchange a whole classification unit C1 to Cn.

It has to be noted that the feedback signals and connections of the processing units of the embodiments according to FIGS. 3 to 5 are not limited to the represented embodiments. It is conceivable that some of the feedback signals or some of the connections are omitted. In general, any combination of processing units is possible to obtain any possible structure.

Furthermore, it is feasible that—applying the present invention for hearing devices—the several processing stages are distributed between two hearing devices, i.e. one hearing device located at the right ear, the other hearing device located at the left ear. For this embodiment, the information exchange is provided by a wired or a wireless transmission link.

Figure 6:
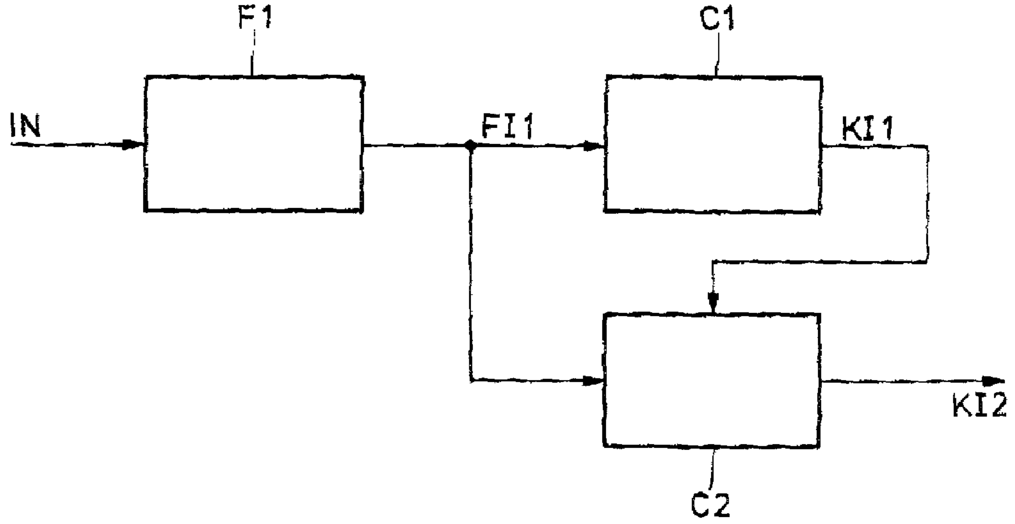
FIG. 6 an embodiment of the present invention which is simplified compared to the two-stage embodiment according to FIG. 2, and FIG. 7 a hearing device with a multistage device according to FIGS. 2 to 6.

In FIG. 6 a simplified embodiment of the present invention re is again represented to illustrate the above mentioned general explanations to the possible structures and combinations of processing units. Although only one feature extraction unit F1 is represented, two processing stages S1 and S2 are provided. The first processing stage S1 comprises a feature extraction unit F1 and a classification unit C1. In the second processing stage S2, the same features are used as in the first processing stage S1. A recalculation of the features in the second processing stage S2 is therefore not necessary, and it is possible to use the results of the feature extraction unit F1 of the first processing stage S1 in the second processing stage S2. In the second processing stage S2 the classification method is therefore adjusted only, in fact in dependence of the class information KI1 of the first processing stage S1.

Figure 7:
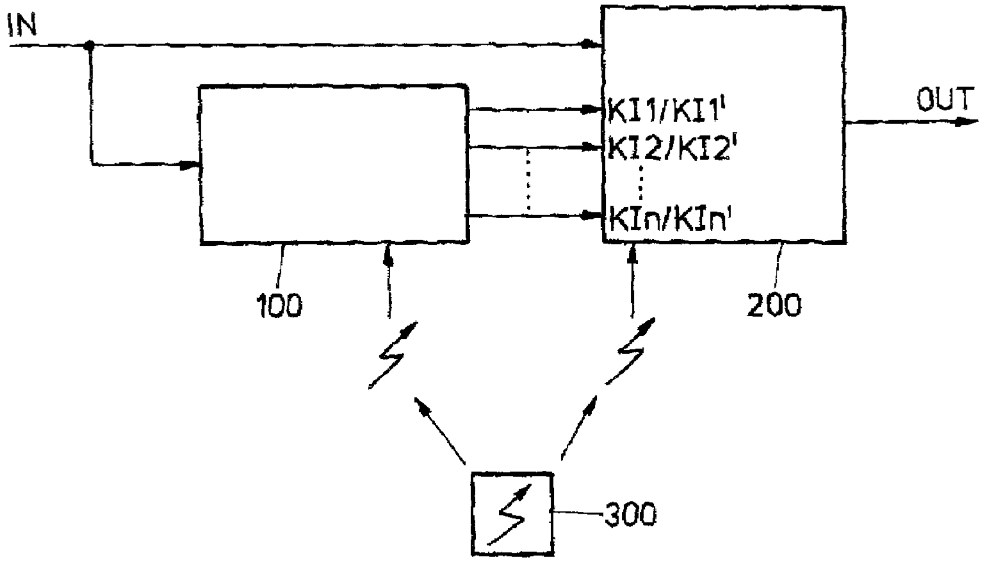

FIG. 7 shows the use of the invention in a hearing device which essentially comprises a transfer unit 200. By the reference sign 100 a multistage processing unit is identified which is realized according to one of the embodiments represented in FIGS. 2 to 6. The input signal IN is fed to the multistage processing unit as well as to the transfer unit 200 in which the acoustic input signal IN is processed with the aid of the class information KI1 to KIn or the revised class information KI1' to KIn', respectively, generated in the multistage processing unit 100. Thereby, it is envisioned to select a suitable hearing program according to the acoustic scene which has been identified as has been described above and in the International Patent Application WO 01/20 965.

By the reference sign 300, a manual input unit is identified by which—for example over a wireless link as schematically represented in FIG. 7—the multistage processing unit 100, as described above, or the transfer unit 200 are affected, if need be. In the case of the hearing device 200 reference is made to WO 01/20965 again which content is herewith integrated.

As possible classification method, one of the following methods can be used for all described embodiments of the present invention:

Hidden Markov Models;
Fuzzy Logic;
Bayes' Classifier;
Rule-based Classifier
Neuronal Networks;
Minimal Distance.

Finally, it has to be noted that technical and/or auditory based features can be extracted in the feature extraction units F1 to Fn (FIGS. 2 to 7). Extensive explanations can again be found in the International Patent Application WO 01/20965 in which technical features as well as auditory-based features are defined.

The preferred use of the present invention for identifying the acoustic scene is the selection of a hearing program in a hearing device. It is also conceivable to use the present invention for speech detection and speech analysis, respectively.

The invention claimed is:

1. A method for identifying an acoustic scene, comprising the steps of:

recording an acoustic input signal; and
providing at least two processing stages wherein
an extraction phase is provided in at least one of the at least two processing stages, in which said extraction phase characteristic features are extracted from the input signal, and wherein
an identification phase is provided in each processing stage, in which said identification phase the extracted characteristic features are classified, and further wherein
class information is generated according to the classification of the features in at least one of the processing stages, wherein said class information characterizes or identifies the acoustic scene,
wherein a manner of processing in a processing stage is selected according to the class information obtained in another processing stage.

2. The method according to claim 1, wherein the class information obtained in the identification phase of a processing stage i determines a processing manner in one of the following, inferior processing stages i+1.

3. The method according to claim 2, wherein, according to class information obtained in the processing stage i, specific features are selected in the extraction phase of the following, inferior processing stage i+1 and/or specific classification methods are selected in the identification phase of the following, inferior processing stage i+1.

4. Method according to claim 2, wherein a post-processing phase is provided in at least one processing stage subsequent to the extraction phase, in which postprocessing stage the class information are revised in order to generate revised class information.

5. Method according to claim 1, wherein a post-processing phase is provided in at least one processing stage subsequent to the extraction phase, in which postprocessing stage the class information are revised in order to generate revised class information.

6. The method according to claim 1, wherein one or more of the following classification methods is used in the identification phase:

Hidden Markov Models;
Fuzzy Logic;
Bayes Classifier;
Rule-based Classifier
Neuronal Networks; and
Minimal Distance.

7. Method according to claim 1, wherein technical and/or auditory-based features are extracted in the extraction phase.

8. A method for identifying an acoustic scene, comprising the steps of:

recording an acoustic input signal; and
providing at least two processing stages wherein
an extraction phase is provided in at least one of the at least two processing stages, in which said extraction phase characteristic features are extracted from the input signal, and wherein
an identification phase is provided in each processing stage, in which said identification phase the extracted characteristic features are classified, and further wherein
class information is generated according to the classification of the features in at least one of the processing stages, wherein said class information characterizes or identifies the acoustic scene, and wherein an extraction phase is provided in each processing stage, in which extraction phase characteristic features are extracted from the input signal, and further wherein a manner of processing in a processing stage is selected according to the class information obtained in another processing stage.

9. The method according to claim 8, wherein the class information obtained in the identification phase of a processing stage i determines a processing manner in one of the following, inferior processing stages i+1.

10. The method according to claim 9, wherein, according to class information obtained in the processing stage i, specific features are selected in the extraction phase of the following, inferior processing stage i+1 and/or specific classification methods are selected in the identification phase of the following, inferior processing stage i+1.

11. Method according to claim 9, wherein a post-processing phase is provided in at least one processing stage subsequent to the extraction phase, in which postprocessing stage the class information are revised in order to generate revised class information.

12. Method according to claim 8, wherein a post-processing phase is provided in at least one processing stage subsequent to the extraction phase, in which postprocessing stage the class information are revised in order to generate revised class information.

13. A method for identifying an acoustic scene, comprising the steps of:

recording an acoustic input signal; and providing at least two processing stages wherein an extraction phase is provided in at least one of the at least two processing stages, in which said extraction phase characteristic features are extracted from the input signal, and wherein an identification phase is provided in each processing stage, in which said identification phase the extracted characteristic features are classified, and further wherein class information is generated according to the classification of the features in at least one of the processing stages, wherein said class information characterizes or identifies the acoustic scene, and wherein an extraction phase is provided in each processing stage, in which extraction phase characteristic features are extracted from the input signal, and further wherein the class information obtained in the identification phase of a processing stage i determines a processing manner in one of the following, inferior processing stages i+1.

14. The method according to claim 13, wherein, according to class information obtained in the processing stage i, specific features are selected in the extraction phase of the following, inferior processing stage i+1 and/or specific classification methods are selected in the identification phase of the following, inferior processing stage i+1.

15. Method according to claim 14, wherein a post-processing phase is provided in at least one processing stage subsequent to the extraction phase, in which postprocessing stage the class information are revised in order to generate revised class information.

16. Method according to claim 13, wherein a post-processing phase is provided in at least one processing stage subsequent to the extraction phase, in which postprocessing stage the class information are revised in order to generate revised class information.

17. Use of the method according to one of the claims 1, 8, 13, 2, 9, 14, 3, 10 and 5, 12, 16, 4, 11, 15, 6, 7 for the adjustment of at least one hearing device to a momentary acoustic scene.

18. Use of the method according to claim 17, wherein a hearing program or a transfer function between at least one microphone and a speaker in a hearing device is selected according to a determined acoustic scene.

19. Use of the method according to one of the claims 1, 8, 13, 2, 9, 14, 3, 10 and 5, 12, 16, 4, 11, 15, 6, 7 for speech analysis or speech detection.

20. A device for identifying an acoustic scene in an input signal, the device comprising:

at least two processing stages;

a feature extraction unit in at least one of the at least two processing stages; and a classification unit in each one of said at least two processing stages, wherein the input signal is fed to the feature extraction unit, an output of which is at least fed to one of the at least two classification units, and wherein at least one of the at least two classification units is operatively connected to at least another of the at least two classification units in order to adjust processing according to class information in another processing stage.

21. The device according to claim 20, further comprising a feature extraction unit in each processing stage.

22. The device according to claim 21, wherein the class information of a processing stage i is fed to a following, inferior processing stage i+1.

23. The device according to claim 22, wherein the class information of a processing stage i is fed to a feature extraction unit of a following, inferior processing stage i+1, and/or wherein the class information of a processing stage i is fed to a classification unit of a following, inferior processing stage i+1.

24. The device according to claim 20, wherein the class information is fed to other processing stages.

25. The device according to claim 24, wherein the class information of a processing stage i is fed to a following, inferior processing stage i+1.

26. The device according to claim 25, wherein the class information of a processing stage i is fed to a feature extraction unit of a following, inferior processing stage i+1, and/or wherein the class information of a processing stage i is fed to a classification unit of a following, inferior processing stage i+1.

27. The device according to claim 21, wherein the class information is fed to other processing stages.

28. The device according to claim 27, wherein the class information of a processing stage i is fed to a following, inferior processing stage i+1.

29. The device according to claim 28, wherein the class information of a processing stage i is fed to a feature extraction unit of a following, inferior processing stage i+1, and/or wherein the class information of a processing stage i is fed to a classification unit of a following, inferior processing stage i+1.

30. The device according to claim 20, wherein the class information of a processing stage i is fed to a following, inferior processing stage i+1.

31. The device according to claim 30, wherein the class information of a processing stage i is fed to a feature extraction unit of a following, inferior processing stage i+1, and/or wherein the class information of a processing stage i is fed to a classification unit of a following, inferior processing stage i+1.

32. The device according to one of the claims 21, 24, 27, 30, 22, 25, 28, 31, 23, 26, 29 and 20, wherein the class information obtained in at least one processing stage is fed to a post-processing unit in order to generate revised class information.

33. The device according to claim 20 or 21, wherein the class information of all processing stages is fed to a decision unit.

34. The device according to claim 33, wherein the decision unit is operatively connected to at least one of the feature extraction units and/or to at least one of the classification units.

35. A hearing device with a transfer unit operatively connected to at least one microphone and to a converter unit, in particular to a speaker, and with a device according to one of the claims 21, 24, 27, 30, 22, 25, 28, 31, 23, 26, 29 and 20 for generating class information, whereas the class information is fed to the transfer unit.

36. The hearing device according to claim 35, further comprising an input unit which is operatively connected to the transfer unit.

37. The hearing device according to claim 36, comprising a wireless link between the input unit and the transfer unit.

* * * * *